(12) United States Patent
Kopp et al.

(10) Patent No.: US 7,095,911 B2
(45) Date of Patent: Aug. 22, 2006

(54) CHIRAL IN-FIBER POLARIZER APPARATUS AND METHOD

(75) Inventors: Victor Il'ich Kopp, Flushing, NY (US); Victor Tchourikov, West Patterson, NJ (US)

(73) Assignee: Chiral Photonics, Inc., Clifton, NJ (US)

( * ) Notice: Subject to any disclaimer, the term of this patent is extended or adjusted under 35 U.S.C. 154(b) by 87 days.

(21) Appl. No.: 10/972,966

(22) Filed: Oct. 25, 2004

(65) Prior Publication Data

US 2005/0089271 A1 Apr. 28, 2005

Related U.S. Application Data

(60) Provisional application No. 60/514,459, filed on Oct. 24, 2003.

(51) Int. Cl.
*G02B 6/00* (2006.01)

(52) U.S. Cl. .............................. 385/11; 385/10; 385/24; 385/123

(58) Field of Classification Search .................. 285/10, 285/11, 24, 123, 147
See application file for complete search history.

(56) References Cited

U.S. PATENT DOCUMENTS

| | | | | |
|---|---|---|---|---|
| 5,452,394 A | * | 9/1995 | Huang .......................... | 385/123 |
| 6,181,465 B1 | * | 1/2001 | Grubb et al. ................ | 359/337 |
| 6,229,937 B1 | * | 5/2001 | Nolan et al. .................. | 385/24 |
| 6,721,469 B1 | * | 4/2004 | Kopp et al. .................... | 385/11 |

* cited by examiner

*Primary Examiner*—Akm Enayet Ullah
(74) *Attorney, Agent, or Firm*—Edward Etkin, Esq.

(57) ABSTRACT

A chiral in-fiber polarizer implemented in a chiral fiber structure having a core and a cladding surrounding the core, is provided. The chiral polarizer includes an entry end for receiving incident light and an exit end for outputting polarized light, as well as a pitch variation along its length between the entry and exit ends in accordance with a predetermined desirable pitch profile, wherein in one embodiment of the inventive polarizer, the inverse value of the chiral structure's pitch at the exit end is less than at the entry end, and preferably substantially equal to zero. The pitch profile may be advantageously selected to correspond to one or more predetermined pitch configurations, may be determined in accordance with one or more mathematical functions, or may be random. In accordance with the present invention, at least one of various parameters of the chiral structure, including, but not limited to, the core and cladding refractive indices and sizes, and the pitch profile, may be configured and selected to substantially eliminate the undesirable polarization component of the incident light by achieving an optimized extinction ratio within a desired spectral range. In another embodiment of the inventive chiral polarizer, the pitch profile is selected and configured such that the inverse value of the chiral structure's pitch at the entry end of the chiral structure is also zero. This arrangement enables significant reduction of insertion loss of the incident light entering the entry end of the inventive polarizer.

26 Claims, 2 Drawing Sheets

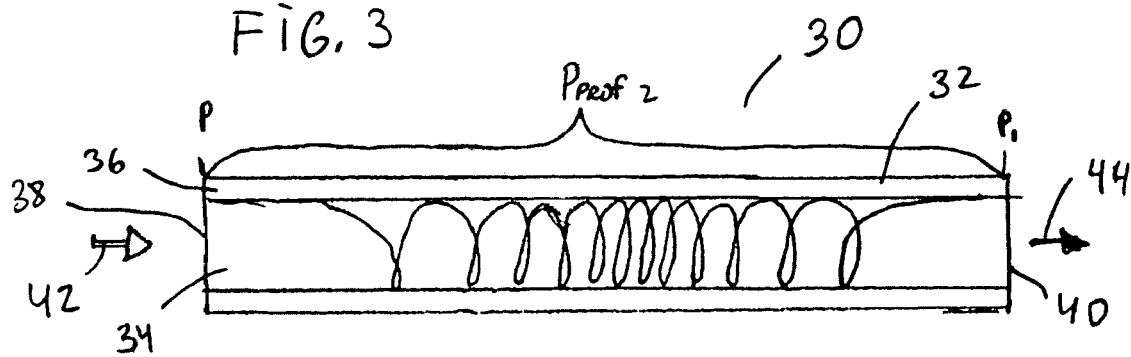
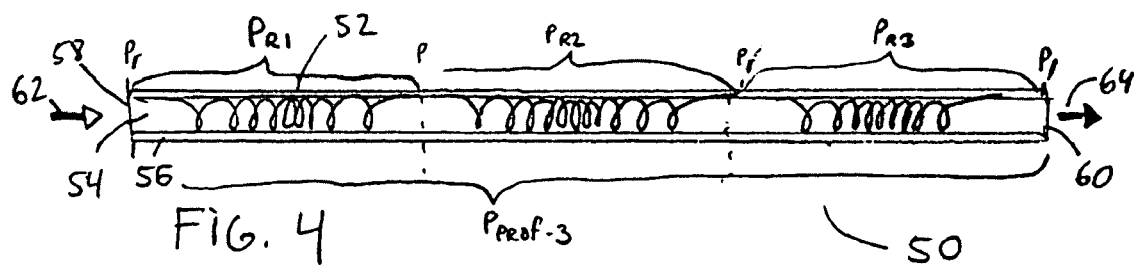

CHIRAL IN-FIBER POLARIZER APPARATUS AND METHOD

CROSS REFERENCE TO RELATED APPLICATIONS

The present patent application claims priority from the commonly assigned U.S. provisional patent application Ser. No. 60/514,459 entitled "Chiral In-Fiber Polarizer Apparatus and Method" filed Oct. 24, 2003.

FIELD OF THE INVENTION

The present invention relates generally to polarizers, and more particularly to an in-fiber polarizer based on a chiral optical fiber.

BACKGROUND OF THE INVENTION

Any device that requires polarized light uses one or more polarizers. Polarizers have many industrial applications. For example, polarizers may be utilized in electro-optical modulators and laser subsystems. In essence, a polarizer eliminates an undesirable light component of a first polarization, and allows a desirable light component of a second polarization to pass through.

Of particular interest is the use of polarizers as in-line modules in optical fibers. Previously known in-line polarizers typically comprise an assembly with a first lens following a first optical fiber for collimating the light emerging from the fiber. The collimated light then passes though a polarizer plate and is then focused by a second lens into a second optical fiber. The main disadvantage of this type of polarizer is that it is relatively expensive and difficult to construct. Furthermore, the lens-based polarizer interrupts the optical fiber leading to optical loss and undesirable reflection. Finally, the lens-based polarizer introduces a device into the fiber that is much larger than the fiber, thereby causing potential space and size issues.

One attempt to solve the above problems was the development of another in-line fiber polarizer that was constructed by wrapping the optical fiber in several loops around a circular member before allowing the fiber to continue on its way. This arrangement eliminated some of the drawbacks of the previously known lens-based polarizer—for example, this was a true in-fiber device that did not interrupt the fiber with a much larger device. However, the coil-based polarizer suffered from another significant drawback—the coil element around which the fiber needed to be wrapped was typically many centimeters in diameter. Thus, while not as unwieldy as a lens-based polarizer, the coil-based polarizer was still very bulky and difficult or impossible to use in many applications.

A novel in-fiber polarizer, that advantageously solved all of the problems of the prior art polarizers was disclosed in a commonly assigned U.S. Pat. No. 6,721,469, issued on Apr. 13, 2004, and entitled "Chiral In-Fiber Adjustable Polarizer Apparatus and Method" (hereinafter the "Adjustable Polarizer patent"), which is hereby incorporated by reference in its entirety. That novel adjustable polarizer worked with circularly polarized light and utilized a fiber component that functioned as a quarter-wave plate to convert circular polarization into linear polarization over a relatively narrow frequency band. The fact that polarization conversion only happens across a narrow frequency band, is one of the chief limitations and drawbacks of quarter-wave plates and quarter-wave plate-type devices. In addition, since most practical applications utilize linearly polarized light (for example transmitted through standard polarization-maintaining fibers), the polarizer disclosed in the Adjustable Polarizer patent required conversion of incoming light into circularly polarized light prior to entering the polarizer.

It would thus be desirable to provide an in-line polarizer that does not interrupt an optical fiber with a larger structure and that is capable of operating with an unpolarized light input. It would further be desirable to provide an in-line polarizer having a low insertion loss, and a desirable extinction ratio within a desirable spectral range. It would also be desirable to provide an in-line polarizer that is inexpensive and easy to fabricate.

BRIEF DESCRIPTION OF THE DRAWINGS

FIG. 3 is a schematic diagram of a side view of a third embodiment of the chiral in-fiber polarizer of the present invention configured for minimizing insertion loss of incident light; and FIG. 4 is a schematic diagram of a side view of a fourth embodiment of the chiral in-fiber polarizer of FIG. 1, configured for further maximizing the extinction ratio thereof.

SUMMARY OF THE INVENTION

Figure 1:
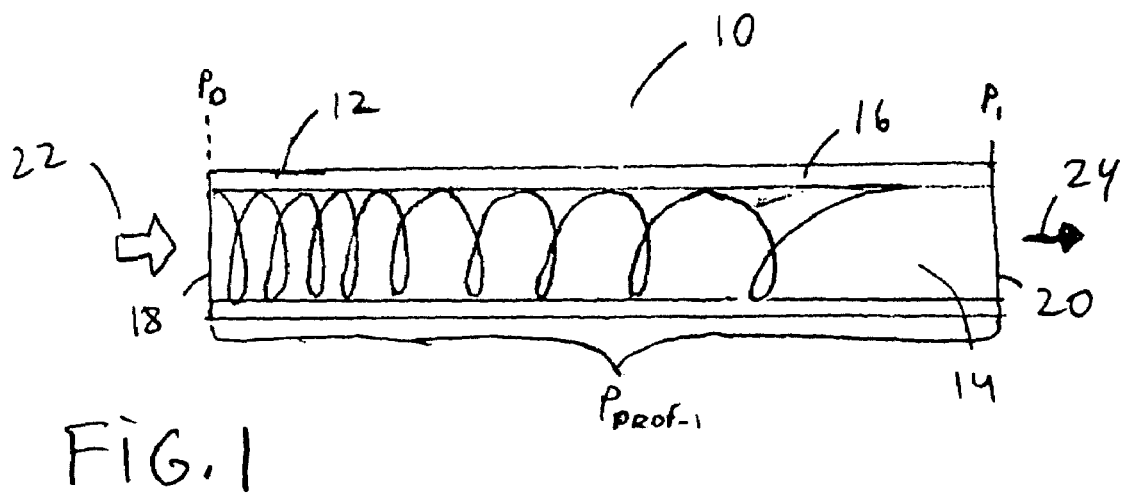
FIG. 1 is a schematic diagram of a side view of first and second embodiments of the chiral in-fiber polarizer of the present invention.

The present invention is directed to a novel chiral in-fiber polarizer that is based on a specially configured optical chiral fiber structure, for example having advantageous optical properties similar to a cholesteric liquid crystal (CLC) structure. The chiral fiber structure used in the inventive chiral in-fiber polarizer achieves optical properties similar to a CLC structure because it satisfies the requirement that in a CLC structure the pitch of the structure is twice its period. This is accomplished by using a chiral fiber structure having geometric birefringence with 180 degree symmetry. Such properties may be obtained by imposing two identical coaxial helixes along a fiber structure, where the second helix is shifted by half of the structure's pitch forward from the first helix. Such structures are described in greater detail in the co-pending commonly assigned U.S. Patent applications entitled "Apparatus and Method for Manufacturing Fiber Gratings", "Apparatus and Method of Manufacturing Helical Fiber Bragg Gratings", "Apparatus and Method for Fabricating Helical Fiber Bragg Gratings", "Helical Fiber Bragg Grating", and "Long Period Chiral Fiber Grating and Apparatus and Method of Fabrication Thereof", all of which are hereby incorporated by reference herein in their entirety. Several embodiments of the inventive chiral in-fiber polarizer are discussed below.

A chiral in-fiber polarizer implemented in a chiral fiber structure is provided in accordance with the present invention. The chiral fiber is selected with a predetermined handedness and scatters the circularly polarized light matching its handedness while transmitting circularly polarized light of opposite handedness.

In summary, the chiral polarizer comprises a chiral fiber structure having an optical chiral fiber core of a predetermined handedness (i.e., right or left), surrounded by a cladding, and includes an entry end for receiving incident light, and an exit end for outputting polarized light. The handedness of the chiral fiber structure is important because the structure will scatter circular or elliptical components of incident light matching its handedness and will pass through the components of opposite handedness.

The key novel feature of the inventive chiral fiber polarizer is a pitch variation along its length between the entry and exit ends in accordance with a predetermined desirable pitch profile. The pitch profile may be advantageously selected to correspond to one or more predetermined pitch configurations, may be determined in accordance with one or more mathematical functions, or may be random. In accordance with the present invention, at least one of various parameters of the chiral structure, including, but not limited to, the core and cladding refractive indices and sizes, and the pitch profile, may be configured and selected to achieve an optimized extinction ratio within a desired spectral range, thereby substantially eliminating the undesirable polarization component of the incident light entering the polarizer.

In one embodiment of the present invention, the above goal is accomplished by selecting and configuring the pitch profile such that an inverse value of the chiral structure's pitch at the exit end of the structure is substantially zero, and at a higher value at the entry end. In an alternate embodiment of the first embodiment of the present invention, the pitch profile is selected and configured such that the inverse value of the chiral structure's pitch at the entry end of the structure is substantially zero, and at a higher value at the exit end. In a second embodiment of the present invention, the inverse value of the chiral structure's pitch at the entry end is greater than the inverse value of the chiral structure's pitch at the exit end. In an alternate embodiment of the second embodiment of the present invention, the pitch profile is selected and configured such that the inverse value of the chiral structure's pitch at the exit end is greater than the inverse value of the chiral structure's pitch at the entry end. In a third embodiment of the inventive chiral polarizer, the pitch profile is selected and configured such that the inverse value of the chiral structure's pitch is zero at both the entry end the exit ends of the chiral structure. In a fourth embodiment of the present invention, multiple pitch profiles can be imposed on sequential regions of a chiral optical fiber structure, in essence forming a global pitch profile that essentially functions as two or more sequential novel chiral polarizer structures with alternating regions where inverse pitch is substantially equal to zero. The various above-described embodiments of the present invention, each have specific advantages making them advantageous in particular types of applications.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

DETAILED DESCRIPTION OF THE PREFERRED EMBODIMENTS

The present invention is directed to a chiral in-fiber polarizer implemented in a chiral fiber structure. In summary, the chiral polarizer comprises an optical fiber core surrounded by a cladding and includes an entry end for receiving incident light and an exit end for outputting polarized light. The novel chiral fiber polarizer also includes a pitch variation along its length between the entry and exit ends in accordance with a predetermined desirable pitch profile. The pitch profile may be advantageously selected to correspond to one or more predetermined pitch configurations, may be determined in accordance with one or more mathematical functions, or may be random. In accordance with the present invention, at least one of various parameters of the chiral structure, including, but not limited to, the core and cladding refractive indices and sizes, and the pitch profile, may be configured and selected to substantially eliminate the undesirable polarization component of the incident light by achieving an optimized extinction ratio within a desired spectral range.

In one embodiment of the present invention, the above goal is accomplished by selecting and configuring the pitch profile such that an inverse value of the chiral structure's pitch at the exit end of the structure is substantially zero, and at a higher value at the entry end. This arrangement is advantageous when it is desirable to filter out an elliptically polarized component of the incident light, and it is also desirable to produce a substantially linearly polarized light component at the exit end.

In an alternate embodiment of the first embodiment of the present invention, the pitch profile is selected and configured such that the inverse value of the chiral structure's pitch at the entry end of the structure is substantially zero, and at a higher value at the exit end. This arrangement is advantageous when it is desirable to filter out a linearly polarized component of the incident light, and it is also desirable to produce an elliptically polarized light component at the exit end.

In a second embodiment of the present invention, the inverse value of the chiral structure's pitch at the entry end is greater than the inverse value of the chiral structure's pitch at the exit end. This arrangement is advantageous when it is desirable to filter out an elliptically polarized component of the incident light, and it is also desirable to produce an elliptically polarized light component at the exit end having a higher eccentricity than the elliptically polarized light components at the entry end.

In an alternate embodiment of the second embodiment of the present invention, the pitch profile is selected and configured such that the inverse value of the chiral structure's pitch at the exit end is greater than the inverse value of the chiral structure's pitch at the entry end. This arrangement is advantageous when it is desirable to filter out an elliptically polarized component of the incident light, and it is also desirable to produce an elliptically polarized light component at the exit end having a lower eccentricity than the elliptically polarized light components at the entry end.

In a third embodiment of the inventive chiral polarizer, the pitch profile is selected and configured such that the inverse value of the chiral structure's pitch is zero at both the entry end the exit ends of the chiral structure. This arrangement is advantageous when it is desirable to filter out a linearly polarized component of the incident light, and it is also desirable to produce a linearly polarized light component at the exit end. In particular, this configuration of the inventive chiral structure can serve to optimize or "clean-up" incident linearly polarized light of one orientation by virtually eliminating the undesirable linearly polarized light component of the other orientation while minimizing the insertion loss of the incident linearly polarized light.

In a fourth embodiment of the present invention, multiple pitch profiles can be imposed on sequential regions of a chiral optical fiber structure, in essence forming a global pitch profile that essentially functions as two or more sequential novel chiral polarizer structures with alternating regions where inverse pitch is substantially equal to zero.

Before describing the inventive polarizer in greater detail, it would be advantageous to provide an explanation of the scientific principles behind chiral fibers. A chiral fiber is a novel structure that mimics cholesteric liquid crystal (CLC) properties—the chiral periodic photonic band gap structure—in a fiber form. A commonly assigned co-pending U.S. Patent Application entitled "Helical Fiber Bragg Grating" (hereinafter "HFBG")) which is hereby incorporated by reference in its entirety, disclosed the advantageous implementation of the essence of a chiral periodic photonic band gap (hereinafter "PBG") structure in an optical fiber. This novel approach captured the superior optical properties of cholesteric liquid crystals while facilitating the manufacture of the structure in a continuous (and thus easier to implement) process.

While the chiral in-fiber polarizer of the present invention is described with reference to the above-incorporated embodiments of inventive optical fibers having CLC-like optical properties derived from their helical or double helical structures, it should be noted that the inventive chiral in-fiber polarizer may be advantageously constructed utilizing any optical fiber having chiral properties regardless of how those properties are achieved. Furthermore, it should be noted that the various advantageous CLC-related techniques disclosed in the above-incorporated commonly assigned co-pending U.S. Patent Applications may be readily adapted to, and advantageously utilized in conjunction with, the inventive chiral polarizer as a matter of design choice without departing from the spirit of the invention.

It is well established that the term of art "elliptically polarized light" may refer to either linearly polarized light, circularly polarized light, or any type of light polarization in-between. Thus, any incident light entering the inventive polarizer may be said to include two elliptically polarized components (and thus include either two linear or circular polarized components or anything in-between), where the presence of only one component is desirable at the other end of the polarizer. It should be understood, however, than in a real-world implementation there will always be some minimal quantity of undesirable components at the exit end of the polarizer. Accordingly, the description of the various embodiments of the present invention refer to elliptically polarized light as a generic term by way of example for the purpose of simplification, rather than engaging in repetition of the inventive polarizer's advantageous applicability to both linear and circularly polarized light.

Additionally, while the term "incident light" as used in conjunction with the description of the various embodiments of the present invention, is referred to as having two polarization components (i.e., one desirable and one undesirable), it should be understood to one skilled in the art that the inventive polarizer (in its various embodiments) may be readily utilized in cases where the incident light only has a single polarization component (i.e., polarized incident light), in which case the inventive polarizer either blocks the incident light, passes it through without affecting it, or passes it through while changing some characteristics of its polarization, depending on the type of polarization of the polarized incident light and the configuration of the polarizer's structure, as described below in connection with FIGS. 1 to 4.

The essence of the first embodiment of the present invention is that a chiral optical fiber, having an entry end and an exit end, and configured with a pitch profile that results in the inverse pitch (i.e., when pitch=P, inverse pitch=1/P) being substantially equal to zero at the exit end and greater than zero at the entry end, substantially scatters one of the undesirable elliptically polarized components of incident light, while converting the desirable elliptically polarized component of incident light into a corresponding linearly polarized light component. Preferably, both the conversion of the undesirable elliptically polarized component into a corresponding undesirable linearly polarized component, and scattering thereof are synchronized with one another. It should be noted that any area having an inverse pitch substantially equal to zero corresponds to an area having properties of a birefringent fiber which is similar to a standard polarization maintaining fiber.

Figure 2:
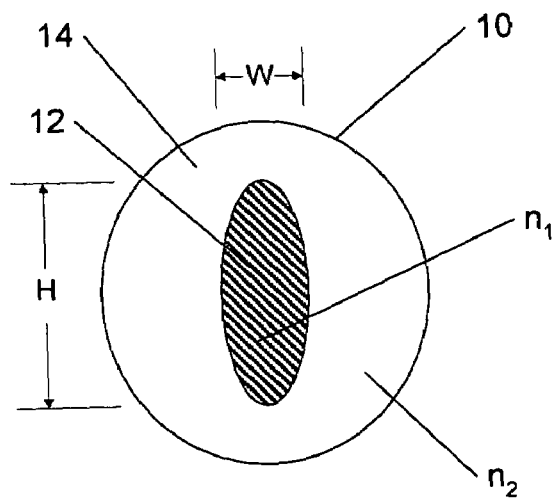
FIG. 2 is a schematic diagram of a cross-section view of an exemplary chiral fiber structure of the chiral in-fiber polarizer of FIG. 1.

Referring now to FIGS. 1 and 2, a first embodiment of an inventive chiral in-fiber polarizer 10 is shown. The chiral polarizer 10 comprises a chiral fiber structure 12 having an outer cladding 16, an inner central core 14, an entry end 18, and an exit end 20. Both the core 14 and the cladding 16 may be composed from a variety of optical materials (e.g. glass or plastic) having refractive indices $n_1$ and $n_2$, respectively, selected as a matter of design choice as further described below. In the exemplary embodiment shown in FIGS. 1 and 2, in accordance with the HFBG patent application, the core 14 is twisted to form a double helix structure. The specific cross-section shape and size (height H and width W) of the core 14 may be selected as a matter of design choice as long as the base core 14 structure maintains 180 degree symmetry such that when it is twisted, a double helix structure is formed. As noted above, the core 14 may be any chiral structure, not just the one disclosed in the HFBG patent application—for example, the core 14 may be constructed by imposing double helix grooves on a cylindrical core, by wrapping the core with a dielectric material, or a combination of the two.

The handedness of the core 14 may be selected as a matter of design choice. Because the chiral polarizer 10 is essentially in the form of an optical fiber, it may be inserted or spliced advantageously into an optical fiber line without interrupting the line and without causing a change in the diameter of the fiber at the site of the chiral polarizer 10.

In accordance with the present invention, the pitch of the chiral structure 12 is preferably distributed between the entry and exit ends 18, 20 in accordance with a predetermined pitch profile $P_{prof-1}$ starting with $P_0$ at the entry end 18 and ending with $P_1$ at the exit end 20. Preferably, an exit inverse pitch ($1/P_0$) at the exit end 20 is substantially zero, while an entry inverse pitch ($1/P_0$) is greater than zero. This general principle of the first embodiment of the present invention (i.e. a predetermined pitch profile distributed between the entry and exit ends, where $1/P_1$ at the exit end is substantially zero) is also applicable to several other embodiments of the present invention, discussed below in connection with FIGS. 3 and 4 (except that in those embodiments, more than one region of the chiral fiber structure has a an inverse pitch of zero).

To achieve polarization in a desired spectral range, the pitch profile $P_{prof-1}$ may be selected and configured as a matter of design choice from one or more of the following pitch configurations, as long as the inverse pitch at the exit end is substantially equal to zero:

1) a chiral long period grating pitch,
2) a pitch corresponding to a non-resonant scattering band,
3) a pitch region corresponding to a chirped chiral fiber grating,
4) a pitch region corresponding to an apodized chiral fiber grating, 5) a pitch variation determined in accordance with at least one predetermined mathematical function, and 6) a random pitch variation.

When incident light 22, having one desirable and one undesirable elliptically polarized components, enters the entry end 18, the chiral structure 12 substantially scatters the undesirable elliptically polarized component of the incident light 22 while converting it into an undesirable linearly polarized light component, and while converting, without scattering, the desirable elliptically polarized component into a corresponding desirable linearly polarized light component 24 which emerges from the exit end 20. Preferably, both the conversion of the undesirable elliptically polarized component into a corresponding undesirable linearly polarized component, and scattering thereof are synchronized with one another. In this case synchronization of scattering and conversion means that only undesirable component is scattered and the desirable component is being converted without scattering substantially at any particular cross-section of the chiral structure 12.

Preferably one or more of the following chiral structure 12 parameters are selected and configured to optimize the extinction ratio of the undesirable elliptically polarized light component: core 14 cross-section shape, core 14 size (H, W), core 14 refractive index $n_1$, cladding 16 size, cladding 16 refractive index $n_2$, and the pitch profile $P_{prof-1}$ are selected and configured to achieve the desired extinction ratio in the desired predetermined spectral range. This embodiment of the chiral polarizer 10 is thus advantageous when it is desirable to filter out an elliptically polarized component of the incident light, and it is also desirable to produce a substantially linearly polarized light component at the exit end.

In an alternate embodiment of the chiral polarizer 10 of FIG. 1, the pitch profile $P_{prof-1}$ is selected and configured such that the exit inverse pitch ($1/P_1$) at the exit end 20 is greater than zero, while the entry inverse pitch ($1/P_0$) at the entry end 18 is substantially zero. In this case, when the incident light 22 has one or two linearly polarized components, output at the exit end 20 will be a desirable elliptically polarized component (not shown), and if the exit inverse pitch ($1/P_1$) inverse pitch is increased as a matter of design choice, the eccentricity of the exiting elliptically polarized component will proportionally decrease bringing it closer to a circularly polarized component. This alternate embodiment of the chiral polarizer 10 is thus advantageous when it is desirable to filter out an elliptically polarized component of the incident light 22, and it is also desirable to produce a substantially elliptically polarized light component at the exit end 20.

In a second embodiment of the chiral polarizer 10 of FIG. 1, the pitch profile $P_{prof-1}$ is selected and configured such that the exit inverse pitch ($1/P_1$) at the exit end 20 is less than the entry inverse pitch ($1/P_0$) at the entry end 18, but neither inverse pitch is substantially equal to zero. In this case, output at the exit end 20 will be a desirable elliptically polarized component (not shown) of higher eccentricity than the incident light components at the entry end 18, and if the exit inverse pitch ($1/P_1$) inverse pitch is increased as a matter of design choice, the eccentricity of the exiting elliptically polarized component will decrease bringing it closer to a circularly polarized component. This second embodiment of the chiral polarizer 10 of FIG. 1, is thus advantageous when it is desirable to filter out an elliptically polarized component of the incident light 22, and it is also desirable to produce an elliptically polarized light component at the exit end 20, having a higher eccentricity than the elliptically polarized light components at the entry end 18.

In an alternate embodiment of the second embodiment of the chiral polarizer 10 of FIG. 1, the pitch profile $P_{prof-1}$ is selected and configured such that the exit inverse pitch ($1/P_1$) at the exit end 20 is greater than the entry inverse pitch ($1/P_0$) at the entry end 18, but neither inverse pitch is substantially equal to zero. In this case, output at the exit end 20 will be a desirable elliptically polarized component (not shown) of lower eccentricity than the incident light components at the entry end 18, and if the exit inverse pitch ($1/P_1$) is increased as a matter of design choice, the eccentricity of the exiting elliptically polarized component will decrease bringing it closer to a circularly polarized component. This arrangement is advantageous when it is desirable to filter out an elliptically polarized component of the incident light, and it is also desirable to produce an elliptically polarized light component at the exit end 20 having a lower eccentricity than the elliptically polarized light components at the entry end 18.

Referring now to FIG. 3, a third embodiment of an inventive chiral in-fiber polarizer is shown as a chiral polarizer 30. The chiral polarizer 30 is advantageous when it is: (1) desirable to filter out a linearly polarized component of the incident light, (2) desirable to produce a linearly polarized light component at the exit end, and (3) desirable to achieve optimization or "cleaning-up" of linearly polarized light.

The chiral polarizer 30 comprises a chiral fiber structure 32 having an outer cladding 36, an inner central core 34, an entry end 38, and an exit end 40. Both the core 34 and the cladding 36 may be composed from a variety of optical materials (e.g. glass or plastic) having refractive indices $n_1$ and $n_2$, respectively, selected as a matter of design choice as further described below. Similarly to the chiral polarizer 10 of FIGS. 1 and 2, the chiral structure 32 may be formed as a double helix structure or other structure with similar properties. Essentially, the chiral structures 12 and 32 are similar other than their respective pitch profiles.

The pitch of the chiral structure 32 is preferably distributed between the entry and exit ends 38, 40 in accordance with a predetermined pitch profile $P_{prof-2}$ starting with $P_1$ at the entry end 38 and ending with $P_1$ at the exit end 40. Preferably, both the entry and exit inverse pitches ($1/P_1$) at the respective entry and exit ends 38, 40 are substantially equal to zero.

To achieve polarization in a desired spectral range, and to minimize insertion loss of incident light 42, the pitch profile $P_{prof-2}$ may be selected and configured as a matter of design choice from one or more of the following pitch configurations, as long as the inverse pitch values at the entry and exit ends are substantially equal to zero:

1) a chiral long period grating pitch, 2) a pitch corresponding to a non-resonant scattering band, 3) a pitch region corresponding to a chirped chiral fiber grating, 4) a pitch region corresponding to an apodized chiral fiber grating, 5) a pitch variation determined in accordance with at least one predetermined mathematical function, and 6) a random pitch variation.

When incident light 42, having one desirable and one undesirable linearly polarized components, enters the entry end 38, the chiral structure 32 first converts both linearly polarized components of the incident light into corresponding elliptically polarized components and then converts the elliptically polarized components into corresponding resulting linearly polarized components, while simultaneously substantially scattering the undesirable elliptically polarized component, such that only the desirable resulting linearly polarized component 44 emerges at the exit end 40. Preferably, both the conversion of the undesirable linearly polarized component into a corresponding undesirable elliptically polarized component, and then conversion back into the undesirable linearly polarized component, and scattering of the undesirable elliptically polarized component thereof are synchronized with one another.

Furthermore, preferably one or more of the following chiral structure 32 parameters are selected and configured to optimize the extinction ratio of the undesirable elliptically polarized light component: core 34 cross-section shape, core 34 size (H, W), core 34 refractive index $n_1$, cladding 36 size, cladding 36 refractive index $n_2$, and the pitch profile $P_{prof-2}$ are selected and configured to achieve the desired extinction ratio in the desired predetermined spectral range, while minimizing insertion loss of incident light 42.

In real world applications, the undesirable polarization component is never entirely eliminated. Thus, the value of an "extinction ratio", measured in dB, is used to indicate the relative elimination of the undesirable polarization component with respect to the desirable polarization component occurring within a predetermined desirable spectral range selected as a matter of design choice. A desirable extinction ratio is advantageous because it indicates a decreased presence of the undesirable polarization component. The synchronized conversion and scattering technique of the polarizer of the present invention advantageously optimizes the extinction ratio of polarized light components in the desirable spectral range.

Minimization of insertion loss during polarization is likewise important for certain applications, for example when incident light is linearly polarized arriving at the entry end of the novel polarizer via a polarization maintaining fiber, and the objective is to optimize or "clean up" the incident linearly polarized light by eliminating as much of the undesirable polarization component of the other orientation (by optimizing the extinction ratio). Having the inverse pitch of zero at the entry end as well as at the exit end of the novel chiral structure, in this embodiment of the present invention, enables minimization of the insertion loss because the undesirable linearly polarized light component is simultaneously converted into elliptically polarized light and back to linearly polarized light while being scattered. This approach preserves the desirable linearly polarized light component while substantially eliminating the undesirable linearly polarized light component, thus minimizing insertion loss.

Referring now to FIG. 4, a fourth embodiment of the chiral polarizer 30 is shown as a chiral polarizer 50. The chiral polarizer 50 is advantageously configured for working with linearly polarized incident light and is especially useful when optimization or "cleaning-up" of linearly polarized light is desired with an extremely desirable extinction ratio as well as a minimal insertion loss. The chiral polarizer 50 comprises a chiral fiber structure 52 having an outer cladding 56, an inner central core 54, an entry end 58, and an exit end 60. In essence, the chiral fiber structure 52 has a pitch profile $P_{prof-3}$ that includes two or more regions having individual pitch profiles configured as if multiple sequential chiral fiber structures 32 were formed as a single unit—i.e., the entry and exit ends of each region are configured with the inverse pitch being zero. By way of example, FIG. 4 shows three such regions having respective pitch profiles $P_{R1}$, $P_{R2}$, and $P_{R3}$. It should be noted that the number of regions with individual pitch profiles that make up the pitch profile $P_{prof-3}$ may be selected as a matter of design choice without departing from the spirit of the invention. When incident light 62 having two linearly polarized orthogonal components enters the entry end 58, it is converted to elliptically polarized light and back to linearly polarized light, while simultaneously preserving the desired polarization component and scattering the undesirable polarization component, several times, once in each region, such that the emerging desirable linearly polarized light component 64 has minimal loss as compared to the incident light 62, and has a greatly optimized extinction ratio with respect to the scattered undesirable polarization component.

The various inventive chiral polarizer embodiments shown in FIGS. 1–4 thus address all of the disadvantages of the previously known in-line polarizers because they: operate with optimized extinction ratios within desired spectral ranges, minimize the insertion loss in case of polarizers 30 and 50, are easy and inexpensive to fabricate, and do not change the size of the optical fiber in which they are used.

Thus, while there have been shown and described and pointed out fundamental novel features of the invention as applied to preferred embodiments thereof, it will be understood that various omissions and substitutions and changes in the form and details of the devices and methods illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. It is the intention, therefore, to be limited only as indicated by the scope of the claims appended hereto.

We claim:

1. A chiral polarizer for achieving polarization of incident light, the incident light having orthogonal elliptically polarized components of a first eccentricity, comprising:
   an elongated chiral optical fiber being of a predetermined handedness, the chiral optical fiber having a first end, a second end, a core, having a core refractive index and a core size, disposed along said fiber's longitudinal axis, and a cladding, having a cladding refractive index and a cladding size, surrounding said core, said chiral optical fiber further having a predetermined pitch profile representative of a variation of a pitch P of said chiral optical fiber between said first end and said second end, wherein in accordance with said predetermined pitch profile, an entry inverse pitch at said entry end, is substantially different from an exit inverse pitch at said exit end, such that one elliptically polarized component of the incident light entering said first end is substantially scattered, while another elliptically polarized component of the incident light is substantially transmitted and converted to an exit elliptically polarized light component having a second eccentricity different from the first eccentricity.

2. The chiral polarizer of claim 1, wherein said predetermined pitch profile is selected and configured with said exit inverse pitch substantially equal to zero, such that said second eccentricity of said exit elliptically polarized light component is sufficiently high thereby producing an exit linearly polarized light component.

3. The chiral polarizer of claim 1, wherein said first eccentricity of the incident light components is sufficiently high such that the incident light components are substantially linearly polarized, and wherein said predetermined pitch profile is selected and configured with said entry inverse pitch substantially equal to zero.

4. The chiral polarizer of claim 1, wherein said predetermined pitch profile is selected and configured with said entry inverse pitch is greater than said exit inverse pitch, such that said second eccentricity is higher than the first eccentricity.

5. The chiral polarizer of claim 1, wherein said predetermined pitch profile is selected and configured with said exit inverse pitch is greater than said entry inverse pitch, such that said second eccentricity is lower than the first eccentricity.

6. The chiral polarizer of claim 1, wherein said first eccentricity of the incident light components is sufficiently high such that the incident light components are substantially linearly polarized, and wherein said predetermined pitch profile is selected and configured with both said entry and exit inverse pitch substantially equal to zero, and having a higher magnitude therebetween, such that said second eccentricity of said exit elliptically polarized light component is sufficiently high thereby producing an exit linearly polarized light component.

7. A chiral polarizer for achieving polarization of incident light, comprising:
an elongated chiral optical fiber being of a predetermined handedness, the chiral optical fiber having a first end, a second end, a core, having a core refractive index and a core size, disposed along said fiber's longitudinal axis, and a cladding, having a cladding refractive index and a cladding size, surrounding said core, said chiral optical fiber further having a predetermined pitch profile representative of a variation of a pitch P of said chiral optical fiber between said first end and said second end, wherein an inverse pitch is determined by an expression 1/P, wherein, in accordance with said predetermined pitch profile, said inverse pitch is substantially equal to zero at said second end, and wherein said inverse pitch is increased to at least one predetermined magnitude above zero in at least one region between said first and said second ends, such that the incident light entering said first end, exits as a first light component being linearly polarized in a first predetermined orientation within a desired predetermined spectral range, while a second light component of a second predetermined linear polarization orientation is substantially scattered.

8. The chiral polarizer of claim 7, wherein at least one of a core cross section shape, said core size, said core refractive index, said cladding size, said cladding refractive index, and said predetermined pitch profile are selected and configured to achieve a desired extinction ratio in a desired predetermined spectral range.

9. The chiral polarizer of claim 7, wherein said predetermined pitch profile comprises at least one pitch region selected from a group of: a chiral long period grating pitch, a pitch corresponding to a non-resonant scattering band, a pitch region corresponding to a chirped chiral fiber grating, a pitch region corresponding to an apodized chiral fiber grating, a random pitch variation, and a pitch variation determined in accordance with at least one predetermined mathematical function.

10. The chiral polarizer of claim 7, wherein the incident light comprises a first elliptically polarized light component and a second elliptically polarized light component, wherein, prior to exiting said second end, said first elliptically polarized light component is substantially converted into said first linearly polarized light component of said first predetermined orientation, and said second elliptically polarized light component is substantially scattered.

11. The chiral polarizer of claim 10, wherein said predetermined pitch profile is selected such that said scattering of said second elliptically polarized light component is synchronized with conversion of said second elliptically polarized light component into said second linearly polarized light component of said second predetermined orientation.

12. The chiral polarizer of claim 7, wherein said first predetermined orientation is substantially perpendicular to said second predetermined orientation.

13. The chiral polarizer of claim 7, wherein the incident light comprises a first linearly polarized incident light component and a second linearly polarized incident light component, and wherein said predetermined pitch profile is selected and configured such that inverse pitch at said first end is substantially equal to zero, thereby minimizing said insertion loss for said first linearly polarized light component within said desired spectral range.

14. The chiral polarizer of claim 13, wherein at least one of a core cross section shape, said core size, said core refractive index, said cladding size, said cladding refractive index, and said predetermined pitch profile are selected and configured to achieve said desired extinction ratio in said desired predetermined spectral range while minimizing said insertion loss.

15. The chiral polarizer of claim 13, wherein said pitch profile is selected and configured such that when entering said first end, said first linearly polarized incident light component is converted into a first elliptically polarized light component, and said second linearly polarized incident light component is converted into a second elliptically polarized light component, wherein, prior to exiting said second end, said first elliptically polarized light component is substantially converted into said first linearly polarized light component of said first predetermined orientation, and said second elliptically polarized light component is substantially scattered.

16. The chiral polarizer of claim 15, wherein said predetermined pitch profile is selected such that said scattering of said second elliptically polarized light component is synchronized with conversion of said second linearly polarized incident light component into said second elliptically polarized light component and subsequent conversion of said second elliptically polarized light component into said second linearly polarized light component of said second predetermined orientation.

17. The chiral polarizer of claim 13, further comprising at least one additional chiral optical fiber positioned in contact with one another sequentially along said chiral optical fiber's longitudinal axis, each having a particular corresponding pitch profile, and each having an inverse pitch value at their entry end and at their exit end substantially equal to zero, thereby optimizing an extinction ratio with respect to said scattered second linearly polarized incident light component.

18. A method for achieving polarization of incident light in a chiral polarizer, comprising the steps of:
(a) providing an elongated chiral optical fiber being of a predetermined handedness, the chiral optical fiber having a first end, a second end, a core, having a core refractive index and a core size, disposed along said fiber's longitudinal axis, and a cladding, having a cladding refractive index and a cladding size, surrounding said core; and
(b) selecting, configuring, and applying, to said chiral optical fiber, a predetermined pitch profile representative of a variation of a pitch P of said chiral optical fiber between said first end and said second end, wherein an inverse pitch is determined by an expression 1/P, wherein, in accordance with said predetermined pitch profile, said inverse pitch is substantially equal to zero at said second end, and wherein said inverse pitch is increased to at least one predetermined magnitude above zero in at least one region between said first and said second ends, such that the incident light entering said first end, exits as a first light component being linearly polarized in a first predetermined orientation within a desired predetermined spectral range, while a second light component of a second predetermined linear polarization orientation is substantially scattered.

19. A chiral polarizer for improving an extinction ratio of incident light having a first and a second linearly polarized incident light components, while minimizing insertion loss thereof, comprising:

an elongated chiral optical fiber being of a predetermined handedness, the chiral optical fiber having a first end, a second end, a core, having a core refractive index and a core size, disposed along its longitudinal axis, and a cladding, having a cladding refractive index and a cladding size, surrounding said core, said chiral optical fiber further having a predetermined pitch profile representative of a variation of a pitch P of said chiral optical fiber between said first end and said second end, wherein an inverse pitch is determined by an expression 1/P, and wherein, in accordance with said predetermined pitch profile, said inverse pitch is substantially equal to zero at each of said first and second ends, and wherein said inverse pitch is increased to at least one predetermined magnitude above zero in at least one region between said first and said second ends, such that of the first and second incident linearly polarized light components entering said first end, only a first exit light component being linearly polarized in a first predetermined orientation within the desired predetermined spectral range with minimized insertion loss exits, while a second exit light component of a second predetermined linear polarization orientation is substantially scattered in accordance with the desired extinction ratio.

20. A chiral polarizer for achieving polarization of incident light, comprising:

an elongated chiral optical fiber being of a predetermined handedness, the chiral optical fiber having a first end, a second end, a core, having a core refractive index and a core size, disposed along said fiber's longitudinal axis, and a cladding, having a cladding refractive index and a cladding size, surrounding said core, said chiral optical fiber further having a predetermined pitch profile representative of a variation of a pitch P of said chiral optical fiber between said first end and said second end, wherein an inverse pitch is determined by an expression 1/P, wherein, in accordance with said predetermined pitch profile, a first inverse pitch at said first end is greater than a second inverse pitch at said second end, and wherein said inverse pitch is increased to at least one predetermined magnitude above zero in at least one region between said first and said second ends, such that the incident light entering said first end, exits as a first light component being elliptically polarized in a first predetermined orientation having a handedness opposite said structure handedness, within a desired predetermined spectral range, while a second light component of a second predetermined elliptical polarization orientation is substantially scattered.

21. The chiral polarizer of claim 20, wherein at least one of a core cross section shape, said core size, said core refractive index, said cladding size, said cladding refractive index, and said predetermined pitch profile are selected and configured to achieve the desired extinction ratio in the desired predetermined spectral range.

22. The chiral polarizer of claim 20, wherein said predetermined pitch profile comprises at least one pitch region selected from a group of: a chiral long period grating pitch, a pitch corresponding to a non-resonant scattering band, a pitch region corresponding to a chirped chiral fiber grating, a pitch region corresponding to an apodized chiral fiber grating, a random pitch variation, and a pitch variation determined in accordance with at least one predetermined mathematical function.

23. The chiral polarizer of claim 20, wherein said second inverse pitch is substantially equal to zero.

24. The chiral polarizer of claim 22, wherein said predetermined pitch profile is selected and configured such that inverse pitch at said first end is substantially equal to zero, such that said insertion loss for said first linearly polarized light component is minimized within said desired spectral range.

25. A chiral polarizer for achieving polarization of incident light, having a first and a second circularly polarized incident light components, comprising:

an elongated chiral optical fiber being of a predetermined handedness, the chiral optical fiber having a first end, a second end, a core, having a core refractive index and a core size, disposed along its longitudinal axis, and a cladding, having a cladding refractive index and a cladding size, surrounding said core, said chiral optical fiber further having a predetermined pitch profile representative of a variation of a pitch P of said chiral optical fiber between said first end and said second end, wherein an inverse pitch is determined by an expression 1/P, and wherein, in accordance with said predetermined pitch profile, a first inverse pitch at said first end is greater than a second inverse pitch at said second end, and wherein said inverse pitch is increased to at least one predetermined magnitude above zero in at least one region between said first and said second ends, such that of the first and second incident circularly polarized light components entering said first end, only a first exit light component being elliptically polarized in a first predetermined orientation within the desired predetermined spectral range exits, while a second exit light component of a second predetermined elliptical polarization orientation is substantially scattered.

26. A chiral polarizer for achieving polarization of incident light having a first and a second linearly polarized incident light components, comprising:

an elongated chiral optical fiber being of a predetermined handedness, the chiral optical fiber having a first end, a second end, a core, having a core refractive index and a core size, disposed along said fiber's longitudinal axis, and a cladding, having a cladding refractive index and a cladding size, surrounding said core, said chiral optical fiber further having a predetermined pitch profile representative of a variation of a pitch P of said chiral optical fiber between said first end and said second end, wherein an inverse pitch is determined by an expression 1/P, wherein, in accordance with said predetermined pitch profile, said inverse pitch is substantially equal to zero at said first end, and wherein said inverse pitch is increased to at least one predetermined magnitude above zero in at least one region between said first and said second ends, such that the first linearly polarized incident light component entering said first end, exits as a first exit light component being elliptically polarized in a first predetermined orientation within a desired predetermined spectral range, while the second linear polarized incident light component is substantially scattered.

* * * * *